US011630990B2

(12) United States Patent
Singh et al.

(10) Patent No.: US 11,630,990 B2
(45) Date of Patent: Apr. 18, 2023

(54) SYSTEMS AND METHODS FOR AUTO MACHINE LEARNING AND NEURAL ARCHITECTURE SEARCH

(71) Applicant: Cisco Technology, Inc., San Jose, CA (US)

(72) Inventors: Abhishek Singh, Pleasanton, CA (US); Debojyoti Dutta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1065 days.

(21) Appl. No.: 16/358,554

(22) Filed: Mar. 19, 2019

(65) Prior Publication Data

US 2020/0302272 A1 Sep. 24, 2020

(51) Int. Cl.
*G06N 3/04* (2006.01)
*G06F 17/18* (2006.01)
*G06K 9/62* (2022.01)
*G06N 3/082* (2023.01)

(52) U.S. Cl.
CPC ........... *G06N 3/0472* (2013.01); *G06F 17/18* (2013.01); *G06K 9/6256* (2013.01); *G06N 3/082* (2013.01)

(58) Field of Classification Search
CPC .... G06F 17/18; G06K 9/6256; G06K 9/6262; G06K 9/627; G06N 3/0472; G06N 3/082; G06N 3/0445; G06N 3/0454; G06N 3/0481; G06N 3/084; G06V 10/82; G06V 10/764; G06V 10/774; G06V 10/776
See application file for complete search history.

(56) References Cited

U.S. PATENT DOCUMENTS

| 2019/0147339 A1* | 5/2019 | Nachum | G06N 3/084 706/25 |
|---|---|---|---|
| 2020/0265315 A1* | 8/2020 | Zoph | G06N 3/08 |
| 2022/0076103 A1* | 3/2022 | Doussot | G06N 3/063 |
| 2022/0092416 A1* | 3/2022 | Houlsby | G06N 3/08 |

FOREIGN PATENT DOCUMENTS

| WO | 2018081563 | 5/2018 |
|---|---|---|
| WO | 2018156942 | 8/2018 |

OTHER PUBLICATIONS

Elsken et al., "Neural Architecture Search: A Survey", Mar. 2019, Journal of Machine Learning Research 20 (2019), pp. 1-21 (Year: 2019).*

(Continued)

*Primary Examiner* — Brent Johnston Hoover
(74) *Attorney, Agent, or Firm* — Polsinelli (57) ABSTRACT

The present disclosure provides systems, methods and computer-readable media for optimizing the neural architecture search for the automated machine learning process. In one aspect, neural architecture search method including selecting a neural architecture for training as part of an automated machine learning process; collecting statistical parameters on individual nodes of the neural architecture during the training; determining, based on the statistical parameters, active nodes of the neural architecture to form a candidate neural architecture; and validating the candidate neural architecture to produce a trained neural architecture to be used in implemented an application or a service.

17 Claims, 5 Drawing Sheets

(56) References Cited

OTHER PUBLICATIONS

Cai et al., "Reinforcement Learning for Architecture Search by Network Transformation," ArXiv org, Jul. 16, 2017, pp. 1-10.
Luo et al., "Neural Architecture Optimization," ArXiv.org, 32nd Conference on Neural Information Processing Systems (NIPS 2018), Montreal, Canada, Oct. 31, 2018, pp. 1-15.
Majumder, "Neural Architecture Meta-Learning via Reinforcement," sagnikmjr.github.io, Oct. 2018, pp. 1-91.

* cited by examiner

SYSTEMS AND METHODS FOR AUTO MACHINE LEARNING AND NEURAL ARCHITECTURE SEARCH

TECHNICAL FIELD

The subject matter of this disclosure relates automated machine learning and associated neural architecture search, and more particularly, to systems, methods and computer-readable media for optimizing the neural architecture search for the automated machine learning process.

BACKGROUND

Typically, a machine learning (ML) process involves preprocessing of a dataset, selecting a neural architecture based on the type and class of the underlying dataset/application, training the neural architecture using a subset of the preprocessed data, validating the neural architecture's predictions using another subset of the preprocessed data and once validated, using it for future predictions for the underlying/intended application.

With advancements in ML, Automatic Machine Learning (AutoML) methods enable automation of the above process from preprocessing to validation of the trained neural architecture. AutoML methods are quite expensive in terms of computation resources. Running the AutoML algorithm instance for every new task/dataset can be costly for the end user.

A major part of Auto ML methods includes a process for finding an appropriate neural architecture for the underlying dataset, which is known as a neural architecture search (NAS), which can be mitigated by transferring the representations/knowledge learned from one domain to the other. Currently, there are a limited number, application dependent, neural architectures to choose from, which is inefficient and not scalable, making the NAS process very inefficient and costly.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

The present disclosure provides systems and methods for improving an AutoML process and more particularly improving a neural architecture search (NAS) process for selecting a neural architecture to be used in an AutoML process. In particular, disclosed systems and methods enable analysis of various statistics of individual nodes of existing neural architectures to determine/assess their usability in a new neural architecture for a given application. Furthermore, disclosed systems and methods further improve NAS processes by reusing/learning from past instances of execution of AutoML processes.

In one aspect, a neural architecture search method including selecting a neural architecture for training as part of an automated machine learning process; collecting statistical parameters on individual nodes of the neural architecture during the training; determining, based on the statistical parameters, active nodes of the neural architecture to form a candidate neural architecture; and validating the candidate neural architecture to produce a trained neural architecture to be used in implemented an application or a service.

In another aspect, the method further includes receiving an input dataset; forming a training set as a first subset of the input dataset to be used for the training of the neural architecture; and forming a validation set as a second subset of the input data set to be used for validating the candidate neural architecture.

In another aspect, the method further includes determining that the candidate neural architecture is not validated; and iteratively repeating the selecting, collecting, determining and validating until an updated candidate neural architecture is validated.

In another aspect, during each iteration, a different neural architecture is selected.

In another aspect, during each iteration, the updated neural architecture is comprised of a first set of nodes and a second set of nodes, wherein the first set of nodes includes active nodes of at least one neural architecture trained in one or more previous iterations and the second set of nodes includes active nodes of a neural architecture trained in a current iteration.

In another aspect, the candidate neural architecture is not validated when, output of the candidate neural architecture, when tested with a validation dataset, is not within a margin of error of a defined output.

In another aspect, the method further includes storing, in a database, statistical information on the selecting, collecting, determining and validating of the candidate neural architecture; wherein determining active nodes of any further candidate neural architecture further includes accessing the database to retrieve the statistical information; and determining an updated neural architecture based on the statistical information.

In one aspect, a neural architecture search system includes a controller configured to execute computer-readable instructions to select a neural architecture for training as part of an automated machine learning process; collect statistical parameters on individual nodes of the neural architecture during the training: determine, based on the statistical parameters, active nodes of the neural architecture to form a candidate neural architecture; and validate the candidate neural architecture to produce a trained neural architecture to be used in implemented an application or a service.

In one aspect, one or more non-transitory computer-readable media include computer-readable instructions, which when executed by one or more processors implementing a neural architecture search system, cause the one or more processors to select a neural architecture for training as part of an automated machine learning process; collect statistical parameters on individual nodes of the neural architecture during the training; determine, based on the statistical parameters, active nodes of the neural architecture to form a candidate neural architecture; and validate the candidate neural architecture to produce a trained neural architecture to be used in implemented an application or a service.

DETAILED DESCRIPTION

ML is becoming an integral part of wide variety of services and applications. Automation of ML has enabled access to and application thereof machine learning to any end user without the need to go through the cumbersome process of manual preprocessing of data, selecting/creating a neural architecture, training the architecture, validating the same and ultimately providing a corresponding product or service to customers and end users.

As mentioned, neural architecture search (NAS) is an integral part of AutoML. Optimization and improvement of the NAS process is described through various example embodiments of the present disclosure. A neural architecture may be defined as a set of nodes structured into layers (a neural network), where each node may be assigned a different weight and have biases applied thereto. Such architecture, takes as input a set of preprocessed data and produced desired outputs after being trained and validated.

Figure 1:
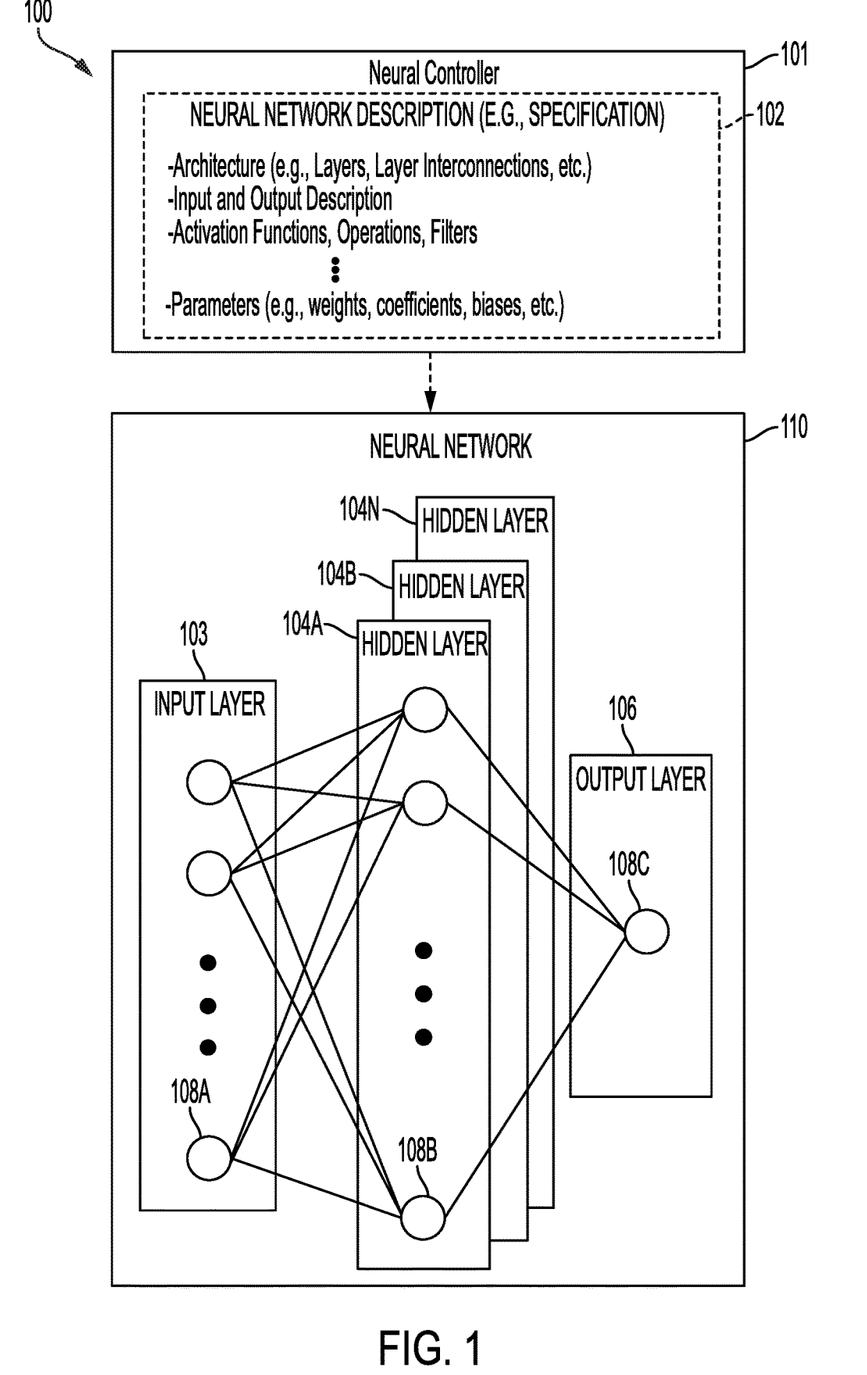
FIG. 1 illustrates an example neural architecture, according to one aspect of the present disclosure.

FIG. 1 illustrates an example neural architecture, according to one aspect of the present disclosure.

FIG. 1 illustrates an example neural architecture 100 of a neural network 110 defined by an example neural network description 102 in neural controller 101 (controller 101). Neural network description 102 can include a full specification of neural network 110, including neural architecture 100. For example, neural network description 102 can include a description or specification of architecture of neural network 110 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

Neural network 110 can reflect the architecture 100 defined in neural network description 102. In this non-limiting example, neural network 110 includes an input layer 103, which includes input data, which can be any type of data such as media content (images, videos, etc.), numbers, text, etc. In one illustrative example, input layer 103 can include data representing a portion of the input media data, such as a patch of data or pixels (e.g., a 128×128 patch of data) in an image corresponding to the input media data.

Neural network 110 can include hidden layers 104A through 104N (collectively "404" hereinafter). Hidden layers 104 can include n number of hidden layers, where n is an integer greater than or equal to one. The number of hidden layers can include as many layers as needed for a desired processing outcome and/or rendering intent. Neural network 110 further includes an output layer 106 that provides an output resulting from the processing performed by hidden layers 104. In one illustrative example, output layer 106 can provide a rendering of input media data. In some cases, output layer 106 can generate a patch of output (e.g., a 64×64×3 patch) for every patch of input data (e.g., the 128×128 patch of data in the previous example), and tile or aggregate each patch of output to generate a final output which provides a rendering of the input media data.

Neural network 110, in this example, is a multi-layer neural network of interconnected nodes. Each node can represent a piece of information. Information associated with the nodes is shared among the different layers and each layer retains information as information is processed. In some cases, neural network 110 can include a feed-forward neural network, in which case there are no feedback connections where outputs of the neural network are fed back into itself. In other cases, neural network 110 can include a recurrent neural network, which can have loops that allow information to be carried across nodes while reading in input.

Information can be exchanged between nodes through node-to-node interconnections between the various layers. Nodes of input layer 103 can activate a set of nodes in the first hidden layer 104A. For example, as shown, each input node of input layer 103 is connected to each node of first hidden layer 104A. Nodes of hidden layer 104A can transform the information of each input node by applying activation functions to the information. The information derived from the transformation can then be passed to and can activate the nodes of the next hidden layer (e.g., 104B), which can perform their own designated functions. Example functions include convolutional up-sampling, data transformation, pooling, and/or any other suitable functions. The output of hidden layer (e.g., 104B) can then activate nodes of the next hidden layer (e.g., 104N), and so on. The output of last hidden layer can activate one or more nodes of output layer 106, at which point an output is provided. In some cases, while nodes (e.g., nodes 108A, 108B, 108C) in neural network 110 are shown as having multiple output lines, a node has a single output and all lines shown as being output from a node represent the same output value.

In some cases, each node or interconnection between nodes can have a weight that is a set of parameters derived from training neural network 110. For example, an interconnection between nodes can represent a piece of information learned about the interconnected nodes. The interconnection can have a numeric weight that can be tuned (e.g., based on a training dataset), allowing neural network 110 to be adaptive to inputs and able to learn as more data is processed.

Neural network 110 can be pre-trained to process the features from the data in input layer 103 using different hidden layers 104 in order to provide the output through the output layer 106. In an example in which neural network 110 is used to render images, neural network 110 can be trained using training data that includes example images. For instance, training images can be input into neural network 110, which can be processed by the neural network 110 to generate outputs which can be used to tune one or more aspects of the neural network 110, such as weights, biases, etc.

In some cases, neural network 110 can adjust weights of nodes using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training media data until the weights of the layers are accurately tuned.

For the example of rendering an image, the forward pass can include passing a training image through neural network 110. The weights can be initially randomized before neural network 110 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

Neural network 110 can include any suitable neural or deep learning type of network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 110 can represent any other neural or deep learning network, such as an autoencoder, a deep belief nets (DBNs), a recurrent neural networks (RNNs), etc.

NAS involves a process in which neural controller 101 searches through various types of neural networks such as CNNs, DBNs, RNNs, etc., to determine which type of neural network, given the input/output description of neural network description 102, can perform closes to the desired output once trained. This search process is currently cumbersome and resource intensive, because every type of available neural network is treated as a "blackbox." In other words, a neural controller such as neural controller 101 selects an available neural network (a blackbox), trains it, validates it and either selects its or not depending on the validation result. However, each available example or type of neural network is a collection of nodes. As will be described below, the present disclosure enables gaining insight into performance of each individual node to assess its performance, which then allows the system to select of a hybrid structure of nodes that may or may not be the same as a given particular structure of a neural network currently available. In other words, the present disclosure enables an AutoML system to pick and choose nodes from different available neural networks and create a new structure that performs best for a given application.

Figure 2:
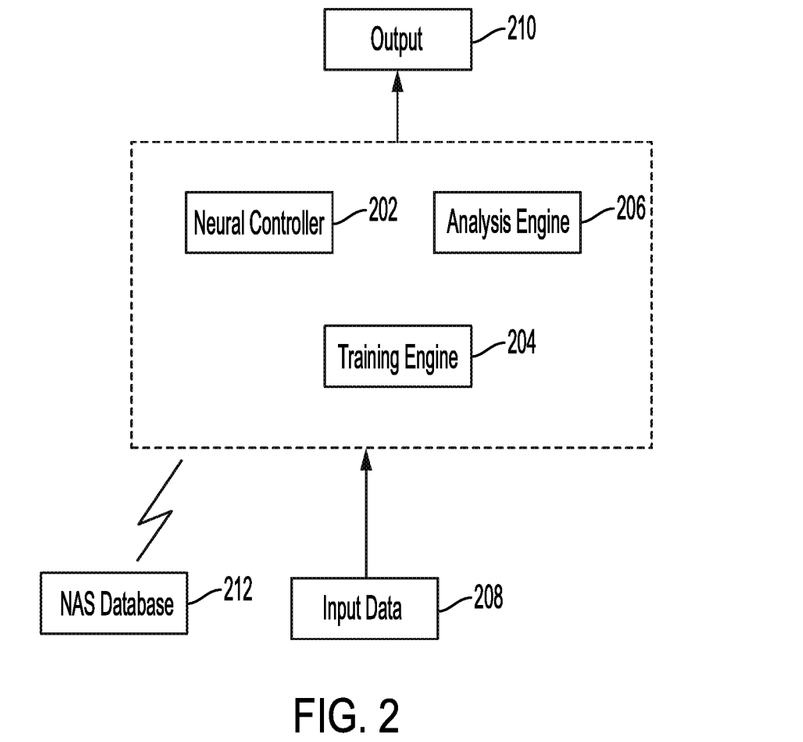
FIG. 2 illustrates a system for neural architecture search system, according to one aspect of the present disclosure.

FIG. 2 illustrates a system for neural architecture search system, according to one aspect of the present disclosure. As shown in FIG. 2, neural architecture search (NAS) system 200 is an example of a system implemented as computer programs on one or more computers in one or more locations, in which the systems, components, and techniques described below can be implemented. While one or more components of NAS system 200 is shown and named as an "engine" it will be understood that any given one component or all components of NAS system 200 can be implemented on one or more processors by executing appropriate set of computer-readable instructions.

NAS system 200 includes neural controller 202 (controller 202), which can be the same as neural controller 101 of FIG. 1, a training engine 204 and an analysis engine 206. NAS 200 receives input data (input data set) 208, neural controller 202 selects a possible neural architecture (e.g., a CNN, a DBN, a RNN, etc.), training engine 204 applies the selected neural network 202 to a portion of the input data (training data), output of which is analyzed by analysis engine 206. Based on the analysis of analysis engine 206, analysis engine 206 may update training parameters (e.g., weights, biases, etc.). Updated parameters are provided to neural controller 202. This process is repeated until a neural structure that provides the best output result given the initial neural network description 102 is identified. This identified neural architecture is provided as output 210 to an end user. Output 210 may also be referred to as a child neural network. The end user can then provide a desired service (ML based service) to its customers, users, etc.

NAS system 200 may also have an associated NAS database 212, which may be communicatively (physically or through a remote connection using any known or to be developed communication method) coupled to NAS system 200 for storing discovered nodes (node combinations or an architecture) and later retrieval and optimized search, as will be described below.

As can be understood from the description of FIGS. 1 and 2, NAS involves a process in which neural controller 101 searches through various types of neural networks such as CNNs, DBNs, RNNs, etc., to determine which type of neural network, given the input/output description of neural network description 102, can perform closes to the desired output once trained. This search process is currently cumbersome and resource intensive, because every type of available neural network is treated as a "black box." In other words, a neural controller such as neural controller 101 selects an available neural network (a black box), trains it, validates it and either selects its or not depending on the validation result. However, each available example or type of neural network is a collection of nodes. As will be described below, the present disclosure enables gaining insight into performance of each individual node to assess its performance, which then allows the system to select of a hybrid structure of nodes that may or may not be the same as a given particular structure of a neural network currently available. In other words, the present disclosure enables an AutoML system to pick and choose nodes from different available neural networks and create a new structure that performs best for a given application.

Figure 3:
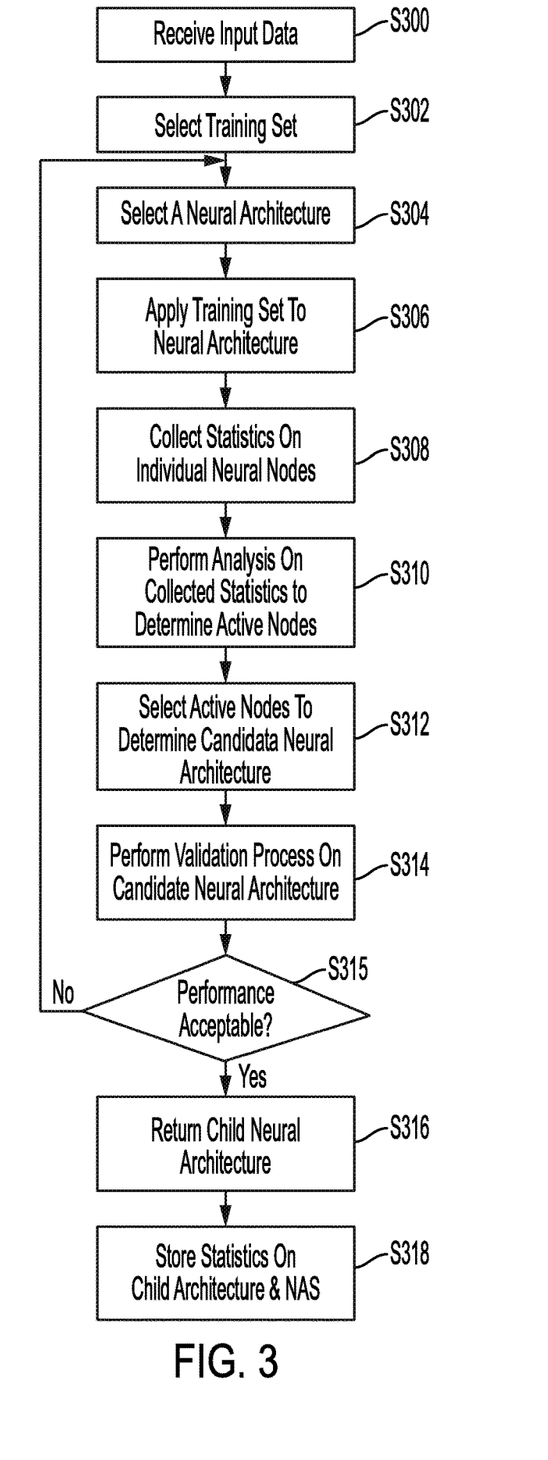
FIG. 3 describes a process by which a neural controller performs a NAS, according to one aspect of the present disclosure.

FIG. 3 describes a process by which a neural controller performs a NAS, according to one aspect of the present disclosure. FIG. 3 will be described from perspective of NAS system 200. However, it will be understood that NAS system 200 can be implemented by one or more processors executing computer-readable instructions corresponding to functionalities of NAS system 200. FIG. 3 will be described in relation to FIGS. 1 and 2.

At S300, NAS system 200 receives input data 208.

At S302, NAS system 200 (via neural controller 202) and may select a training set from input data 208, according to any known or to be developed method. Accordingly, training set to be applied by training engine 204 to a selected neural architecture can be a subset of input data 208. Any portion of input data not used for the training set can then be used as data for validating output of the selected neural architecture (may be referred to as validation dataset).

At S304, NAS system 200 (via neural controller 202) selects a neural architecture from among known or to be developed neural architectures. For example, NAS system 200 can select a CNN, a DBN, a RNN, etc. as a candidate neural architecture.

At S306, NAS system 200 (via neural controller 202 and training engine 204) applies the training set to the neural architecture.

At S308, NAS system 200 (via neural controller 202) collects one or more statistics of individual nodes of the neural architecture. Example of statistics collected include, but are not limited to, gradients of each node with respect to the training loss. L2 Norm of activations of each node, sparsity/L2 Norm of the weights of each node, dimensionality of the tensor (a tensor may be defined as a one or multi-dimensional array of training data, applied weights, biases, etc.) used in each node (for example, in case of nodes of a convolution based neural architecture, it will be kernel dimensions of the tensor) and variance in the activations of each node across multiple batches of training data.

At S310, NAS system 200 (via neural controller 202) examines the collected statistics (statistical parameters) of each node of the candidate neural architecture to determine whether each node is active or not. In one non-limiting example, collected statistics can be collect $L_2$ norm of a feature vector in the output of each and every node. If the feature vector has higher $L_2$ norm (e.g., higher than a configurable and predetermined threshold), then neural controller 202 may determine that the corresponding node is relatively more active that a node for which a corresponding feature vector has an $L_2$ norm of less than the same configurable and predetermined threshold. In another example, variance of arithmetic mean of weights of every node under a fixed training cycle can give provide an estimate of the corresponding node's active status. In one example, the higher the variance for an associated node, the more active will the node be considered by neural controller 202.

At S312, NAS system 200 (via neural controller 202) selects active nodes determined to be active at S310 to form a candidate neural architecture.

At S314, NAS system 200 (via neural controller 202 and/or analysis engine 206) performs a validation process using validation set described above to determine whether the candidate neural architecture's performance is acceptable (e.g., within a margin of error of a defined output result defined by neural network description 102). At S315, NAS system 200 (via neural controller 202) determines if the validation indicates that the performance is acceptable. If acceptable, at S316, NAS system 200 returns the candidate neural architecture as a child neural architecture of output 210.

Thereafter, at S318, NAS system 200 may store the child neural architecture of S316 and/or any other statistics (statistical information) about the NAS of S300 to S316 in NAS database 212. In one example, instead of storing topology of the child neural architecture and associate weights for future use, neural controller 202 stores distribution of selected nodes by sampling multiple architectures and computing distributions (e.g. mean and variance of the distribution) at each layer of a neural network selected for consideration at S304. This allows NAS system 200 to capture and store for reuse various aspects of a NAS result such as subset of nodes generally preferred at a given layer, etc. Furthermore, by taking snapshots of the process of FIG. 3 at regular intervals (duration of which is configurable based on experiments and/or empirical studies), performance of new AutoML algorithms can be compared with previous instances of execution of the process of FIG. 3, which in turn stream lines the process of assigning hyper-parameters to future instances of AutoML, accordingly.

In one example, architectures discovered during intermediate training instances of candidate neural architectures may be stored. For example, intermediate results may be stored to guiding the architecture search during subsequent processes. This in comparison, with currently used methods of storing architectures (which is based on storing the complete model on the storage media), occupies substantially less amount of memory and hence would make storage of lots of models on a storage device feasible. In example embodiments of the present disclosure, one main model encompassing different combinations and permutations of smaller subset of these models may be stored. During each iterations, only the architecture encoding which may be just be a string, is saved. This string is capable of extracting the appropriate model from the main model. In other words, one large and main set of model parameters and architecture encoding may be stored that convey what subset needs to be obtained from this set. Accordingly, storage requirement of n number of models to only 1 main model, may be achieved.

In another example, instead of or in addition to storing architectures discovered during intermediate runs, sequences of test accuracy and training losses of intermediate training instances of candidate neural architectures can allow the subsequent runs to compare how the current training instance is being performed relative to previous instance(s). This approach may also allow neural controller 2022 to avoid favoring particular instances which may have had degraded the training in the past.

Referring back to S315, the process may return back to S304 and NAS system 200 repeats S304 to S315. In one example, NAS system 200 may retain (store) nodes determined to be active based on collected analysis at S310 before selecting the next neural network after returning to S304. In repeating S304 to S315, NAS system 200 may also select a number of additional nodes of the newly selected neural architecture and thus may validate a combination of the stored set of nodes (first set of nodes) selected initially as the candidate neural architecture and the newly selected set of nodes (second set of nodes) after repeating S304 to S316 to form a new (updated) candidate neural architecture.

In one example, NAS system 200 may repeat S304 to S316 until a final candidate neural architecture with validation result falling within a defined margin of error of the defined output is achieved, which is provided as output 210 at S316.

Figure 4:
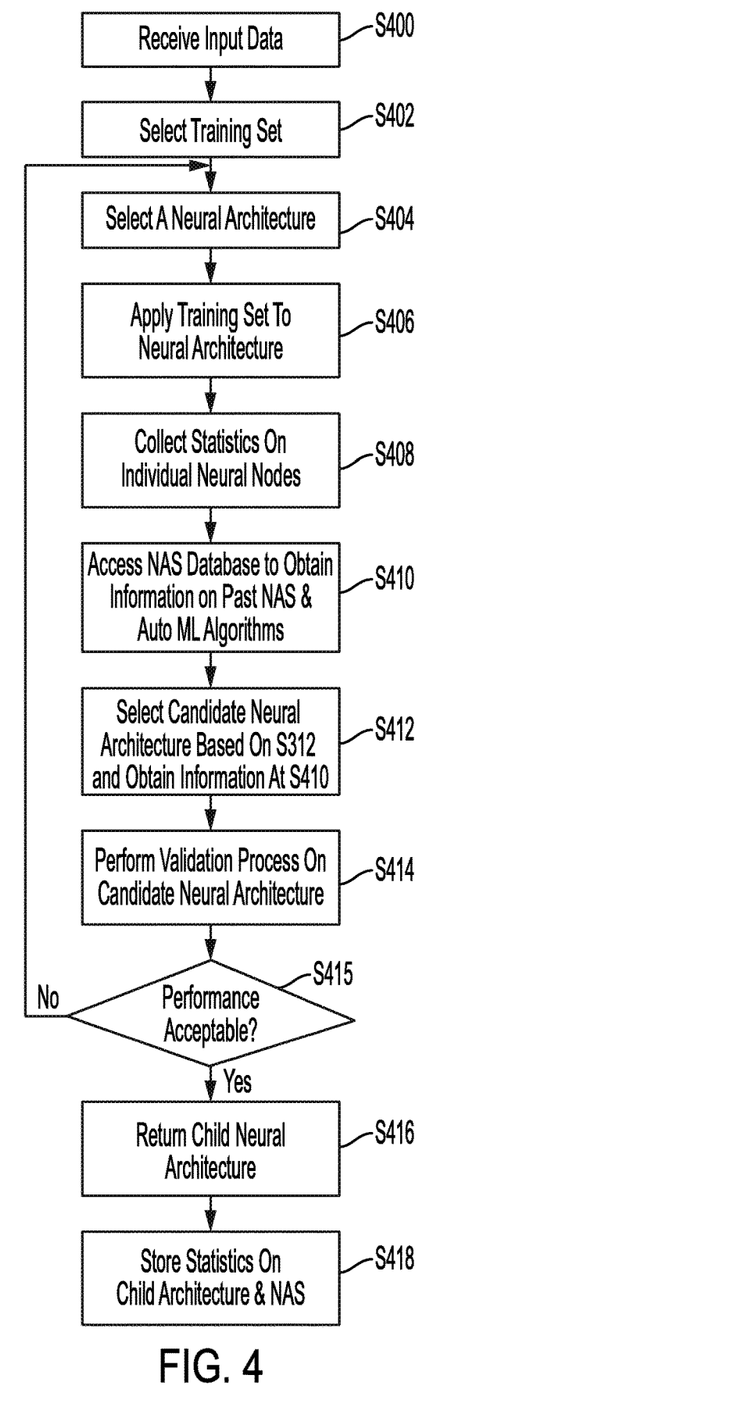
FIG. 4 describes a process by which a neural controller performs a NAS, according to one aspect of the present disclosure.
Figure 5:
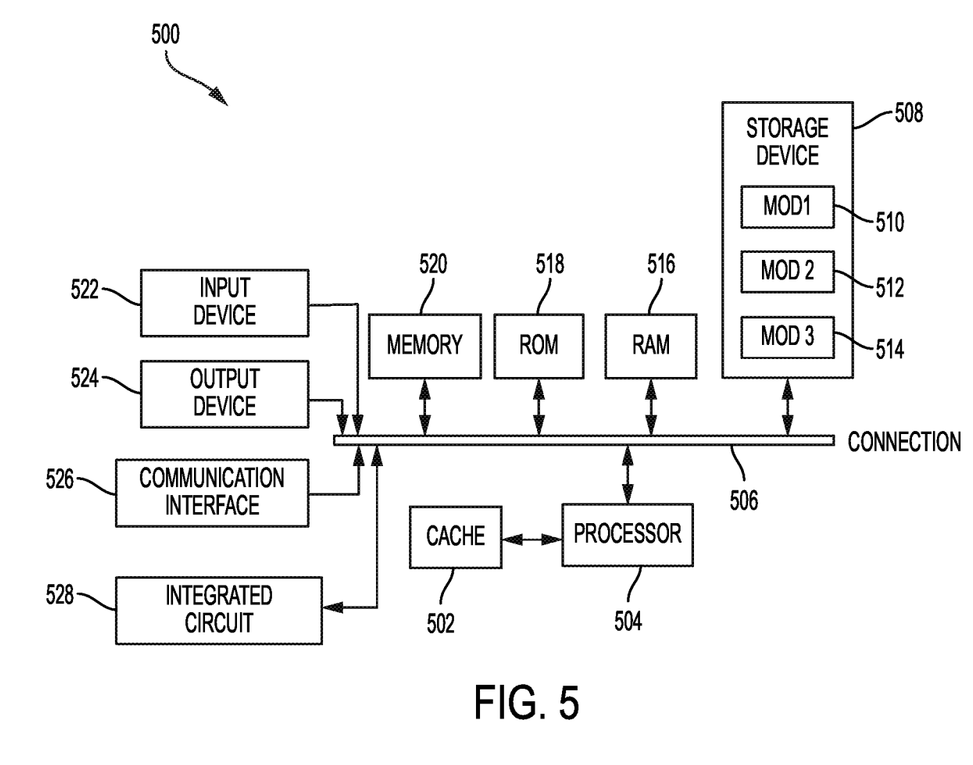
FIG. 5 illustrates an example system including various hardware computing components, according to an aspect of the present disclosure.

FIG. 4 describes a process by which a neural controller performs a NAS, according to one aspect of the present disclosure. FIG. 5 will be described from perspective of NAS system 200. However, it will be understood that NAS system 200 can be implemented by one or more processors executing computer-readable instructions corresponding to functionalities of NAS system 200. FIG. 4 will be described in relation to FIGS. 1-3.

Several steps of the process of FIG. 4 may be the same as the corresponding processes of FIG. 3 and thus may not be described further for sake of brevity.

Steps S400, S402, S404, S406 and S408 will be the same as steps S300, S302, S304, S306 and S308, respectively and thus will not be described further for sake of brevity.

At S410, NAS system 200 (via neural controller 202) accesses NAS database 212 to obtain various information on past NAS and AutoML algorithm executions and resulting neural architectures obtained. For example, information including, but not limited to, stored final-topology, hyper-parameters, traces from prior architectures, configs (in Open Neural Network Exchange (ONNX) format), etc.

At S412, NAS system 200 (via neural controller 202) selects a candidate neural architecture based on the individual node analysis as described with reference to S310 as well as the information obtained from NAS database 212 at S410. For example and in addition to process of S310, at S410, neural controller 202 may have n (an integer greater than 1) number of nodes at a given layer and may fix a configurable retaining threshold k, (where k may be a configurable parameter determined based on experiments and empirical studies) Neural controller 202 may then obtain $L_2$ norm from all nodes in that layer and select k nodes with highest $L_2$ norm to be retained while eliminating other nodes in that same layer.

Thereafter. S414, S415, S416 and S418 will be performed which are the same as S314, S315, S316 and S318, respectively and thus will not be described further for sake of brevity. In one aspect and with reference to selection of receiving input data and selecting a training set (at S300/S302 and/or S400/S402), there may be different tasks for which input data is provided and AutoML is to be performed. In other words, multiple data sets (multiple sets of input data) may be received. However, instead of individually implementing method of FIG. 3 and/or FIG. 4 to each given dataset, NAS 200 (via neural controller 202) may perform a few shot learning process to generalize the different data sets (e.g., find commonality among the input data sets received) using for example known or to be developed classification and regression methods to find a common data set (sample data set) for all the received data sets so that training at S306 and/or S406 can be performed using only the sample data set. This would require a less number of iterations for finding a candidate neural architecture for all the received data sets. In this example, while a sample data set is used for training at S306/S406, fine tuning the architecture and validation at S314/S414 will be implemented using each individual/specific input data set to ensure that the architecture is fine-tuned and tailored for each input data set.

In one specific example implementation, neural controller 202 may have a special neural network structure for identifying what common and reusable nodes of selected and tested neural architectures. This special neural network structure may receive an input from a new problem (e.g., a particular image recognition project to be implemented via trained and validated neural architecture). Neural controller 202 may then feed the special neural network with the results obtained from previous instances of training of various candidate neural architectures and datasets. The special neural network structure may then combine both these inputs to identify common and reusable subsets thereof and produce the output accordingly. This output is further passed down to subsequent layers and if there are significant commonalities of nodes and characteristics, then subsequent layers will be able to use previously learned weights and hence apply previous gained knowledge of neural architectures and individual nodes thereof, which makes training of neural architectures faster and more convenient.

With the above example embodiments described, the disclosure now turns to describing example device/system structures that can be used as NAS system 200, neural controller 101/202, training engine 204 and/or analysis engine 206.

FIG. 5 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 5 illustrates system bus computing system architecture (system) 500 wherein the components of the system are in electrical communication with each other using a connection 506. Exemplary system 500 includes a cache 502 and a processing unit (CPU or processor) 504 and a system connection 506 that couples various system components including the system memory 520, such as read only memory (ROM) 518 and random access memory (RAM) 516, to the processor 504. System 500 can include a cache of high-speed memory connected directly with, in close proximity to, or integrated as part of the processor 504. System 500 can copy data from the memory 520 and/or the storage device 508 to the cache 502 for quick access by the processor 504. In this way, the cache can provide a performance boost that avoids processor 504 delays while waiting for data. These and other modules can control or be configured to control the processor 504 to perform various actions. Other system memory 520 may be available for use as well. The memory 520 can include multiple different types of memory with different performance characteristics. The processor 504 can include any general purpose processor and a service component, such as service 1 510, service 2 512, and service 3 514 stored in storage device 508, configured to control the processor 504 as well as a special-purpose processor where software instructions are incorporated into the actual processor design. The processor 504 may essentially be a completely self-contained computing system, containing multiple cores or processors, a bus, memory controller, cache, etc. A multi-core processor may be symmetric or asymmetric.

To enable user interaction with system 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with system 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 516, read only memory (ROM) 518, and hybrids thereof.

System 500 can include an integrated circuit 528, such as an application-specific integrated circuit (ASIC) configured to perform various operations. The integrated circuit 528 can be coupled with the connection 506 in order to communicate with other components in system 500.

The storage device 508 can include software services 510, 512, 514 for controlling the processor 504. Other hardware or software modules are contemplated. The storage device 508 can be connected to the system connection 506. In one aspect, a hardware module that performs a particular function can include the software component stored in a computer-readable medium in connection with the necessary hardware components, such as the processor 504, connection 506, output device 524, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A neural architecture search method comprising:
   selecting a neural architecture for training as part of an automated machine learning process;
   training the selected neural network architecture with a training set;
   collecting statistical parameters on individual nodes of the neural architecture during the training;
   determining, based on the statistical parameters, active nodes of the neural architecture to form a candidate neural architecture, comprising:
   designating a node as active in response to an $L_2$ norm of a feature vector in an output of the node being higher than a predetermined threshold; or
   designating a node as active in response to an estimate of a variance of an arithmetic mean of weights of every node under a fixed training cycle indicating active status; and
   validating the candidate neural architecture to produce a trained neural architecture to be used in an application or a service.

2. The method of claim 1, further comprising:
   receiving an input dataset;
   forming the training set as a first subset of the input dataset to be used for the training of the neural architecture; and
   forming a validation set as a second subset of the input data set to be used for validating the candidate neural architecture.

3. The method of claim 1, further comprising:
   determining that the candidate neural architecture is not validated; and
   iteratively repeating the selecting, training collecting, determining and validating until an updated candidate neural architecture is validated.

4. The method of claim 3, wherein during each iteration, a different neural architecture is selected.

5. The method of claim 4, wherein during each iteration, the updated neural architecture is comprised of a first set of nodes and a second set of nodes, wherein the first set of nodes includes active nodes of at least one neural architecture trained in one or more previous iterations and the second set of nodes includes active nodes of a neural architecture trained in a current iteration.

6. The method of claim 1, further comprising:
storing, in a database, statistical information on the selecting, collecting, determining and validating of the candidate neural architecture; wherein
determining active nodes of any further candidate neural architecture further comprises:
   accessing the database to retrieve the statistical information; and
   determining an updated neural architecture based on the statistical information.

7. A neural architecture search system comprising:
a controller configured to execute computer-readable instructions to:
   select a neural architecture for training as part of an automated machine learning process;
   train the selected neural network architecture with a training set;
   collect statistical parameters on individual nodes of the neural architecture during the training;
   determine, based on the statistical parameters, active nodes of the neural architecture to form a candidate neural architecture, comprising:
      designate a node as active in response to an $L_2$ norm of a feature vector in an output of the node being higher than a predetermined threshold; or
      designate a node as active in response to an estimate of a variance of an arithmetic mean of weights of every node under a fixed training cycle indicating active status; and
   validate the candidate neural architecture to produce a trained neural architecture to be used in an application or a service.

8. The neural architecture search system of claim 7, wherein the controller is further configured to:
   receive an input dataset;
   form the training set as a first subset of the input dataset to be used for the training of the neural architecture; and
   form a validation set as a second subset of the input data set to be used for validating the candidate neural architecture.

9. The neural architecture search system of claim 7, wherein the controller is further configured to:
   determine that the candidate neural architecture is not validated; and
   iteratively repeat selecting, collecting, training, determining and validating processes until an updated candidate neural architecture is validated.

10. The neural architecture search system of claim 9, wherein during each iteration, the controller selects a different neural architecture compared to previous iterations.

11. The neural architecture search system of claim 10, wherein during each iteration, the updated neural architecture is comprised of a first set of nodes and a second set of nodes, wherein
   the first set of nodes includes active nodes of at least one neural architecture trained in one or more previous iterations and the second set of nodes includes active nodes of a neural architecture trained in a current iteration.

12. The neural architecture search system of claim 9, further comprising:
a database configured to store statistic information on each instance of determining a candidate neural architecture, wherein the controller is further configured to:
   store, in the database, statistical information on the selecting, collecting, determining and validating of the candidate neural architecture; wherein
determining active nodes of any further candidate neural architecture further comprises:
   accessing the database to retrieve the statistical information; and
   determining an updated neural architecture based on the statistical information.

13. One or more non-transitory computer-readable media comprising computer-readable instructions, which when executed by one or more processors implementing a neural architecture search system, cause the one or more processors to perform operations comprising:
   select a neural architecture for training as part of an automated machine learning process;
   train the selected neural network architecture with a training set;
   collect statistical parameters on individual nodes of the neural architecture during the training;
   determine, based on the statistical parameters, active nodes of the neural architecture to form a candidate neural architecture, comprising:
      designate a node as active in response to an $L_2$ norm of a feature vector in an output of the node being higher than a predetermined threshold; or
      designate a node as active in response to an estimate of a variance of an arithmetic mean of weights of every node under a fixed training cycle indicating active status; and
   validate the candidate neural architecture to produce a trained neural architecture to be used in an application or a service.

14. The one or more non-transitory computer-readable media of claim 13, wherein execution of the computer-readable instructions, further cause the one or more processors to:
   receive an input dataset;
   form the training set as a first subset of the input dataset to be used for the training of the neural architecture; and
   form a validation set as a second subset of the input data set to be used for validating the candidate neural architecture.

15. The one or more non-transitory computer-readable media of claim 13, wherein execution of the computer-readable instructions, further cause the one or more processors to:
   determine that the candidate neural architecture is not validated; and
   iteratively repeat selecting, collecting, determining, training and validating until an updated candidate neural architecture is validated.

16. The one or more non-transitory computer-readable media of claim 15, wherein during each iteration, a different neural architecture is selected.

17. The one or more non-transitory computer-readable media of claim 16, wherein during each iteration, the updated neural architecture is comprised of a first set of nodes and a second set of nodes, wherein
   the first set of nodes includes active nodes of at least one neural architecture trained in one or more previous iterations and the second set of nodes includes active nodes of a neural architecture trained in a current iteration.

* * * * *